Feb. 5, 1963 F. L. COOMBS 3,076,945
ELECTRIC OSCILLATORS
Filed March 3, 1959

INVENTOR
FREDERICK LESLIE COOMBS
BY
Kemon, Palmer, Stewart & Estabrook
ATTORNEYS United States Patent Office 3,076,945
Patented Feb. 5, 1963

3,076,945
ELECTRIC OSCILLATORS

Frederick Leslie Coombs, Lebanon Cedars, Chertsey Road, Byfleet, England

Filed Mar. 3, 1959, Ser. No. 796,981
5 Claims. (Cl. 331—117)

The present invention relates to electric oscillators. It is one object of the present invention to provide an improved transistor oscillator capable of operating satisfactorily with a supply voltage as low as three volts.

It is another object of the invention to provide an improved transistor oscillator of which the frequency stability with changes in temperature can be adequate for many purposes.

It is a further object of the invention to provide an improved transistor oscillator which can provide an oscillation the harmonic content of which is sufficiently low for many purposes.

Yet another object of the invention is to provide an improved transistor oscillator which can readily be frequency-modulated.

According to the present invention a transistor oscillator comprises a transistor having a base electrode, a collector electrode and an emitter electrode, the collector electrode being connected on the one hand through an inductor to one terminal of a source of operating voltage and on the other hand through a capacitor to the base electrode, the base electrode being connected through a further inductor to another terminal of the said source which is of the opposite polarity to the first said terminal, and the emitter electrode being connected to a resistive device the other end of which being connected to the said other terminal of the source, the arrangement being such that, in operation, feedback from the collector electrode through the capacitor to the base electrode is such as to sustain oscillations in the circuit. Any convenient arrangement can be used for biasing the base. Preferably the base is biased by means of a potential divider across the source of operating potential and including the said further inductor.

The oscillator has the characteristic that if the resistive device included in the lead to the emitter electrode is made variable, the frequency of the generated oscillations can be varied.

The frequency of the generated oscillation may alternatively be varied (but to a smaller degree) by varying the resistor values in the potential divider which is connected to the base and which contains the further inductor.

Furthermore by providing the variable resistor in the form of a device responsive to a control voltage for varying its resistance, frequency-modulation can be effected. A suitable device of this kind, is for example, a second transistor with its collector electrode connected to the emitter electrode of the first said transistor, the emitter electrode of the second transistor being connected to the said other terminal of the source of operating voltage. The base of the second transistor may be connected through an impedance element to a voltage supply terminal of a potential intermediate the potentials of the terminals already referred to. By varying the magnitude of a control voltage generated across the impedance element in any convenient manner, the effective series resistance between the emitter and collector electrodes of the second transistor can be varied for the purpose of frequency-modulating the generated oscillation.

Other methods of varying the control voltage will be apparent to those skilled in the art.

The invention will now be described, by way of example with reference to the accompanying drawing, in which.

Figure 1:
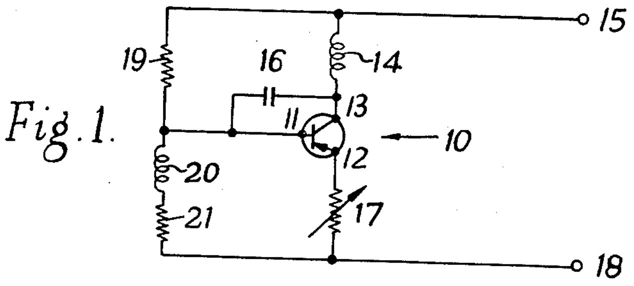
FIG. 1 is a circuit diagram of an oscillator.
Figure 2:
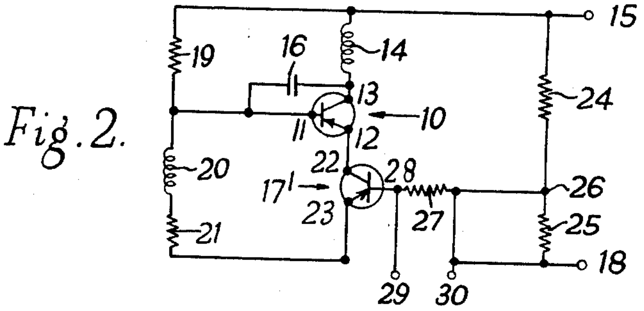
FIG. 2 is a circuit diagram showing the arrangement of FIG. 1 modified for enabling the generated oscillation to be frequency modulated.

In FIGS. 1 and 2 like parts are given the same reference.

In FIG. 1, a transistor oscillator comprises a transistor 10 having a base electrode 11, an emitter electrode 12 and a collector electrode 13.

The collector electrode 13 is connected through an inductor 14 to one terminal 15 of a source (not shown) of operating voltage, and through a capacitor 16 direct to the base electrode 11. The emitter electrode 12 is connected through a variable register 17 to the other terminal 18 of the source of operating potential.

The transistors may be of any type such as the p-n-p or the n-p-n type, the polarity of the voltages applied and connections to the electrodes being chosen to suit the type of transistor used.

Connected between the terminals 15 and 18 of the operating voltage source there is a potential divider comprising a first resistor 19, a further inductor 20 and a second resistor 21 connected together in the order named. The junction between the resistor 19 in the potential divider and the further inductor 20 is connected to the base electrode 11, and the other end of the resistor 19 is connected to the same supply terminal 15 as the inductor 14.

The resistor 21 can be decoupled or partly decoupled by a capacitor if desired. It may alternatively be provided by the ohmic resistance of the inductor 20.

The theoretical explanation of the oscillator is as follows: Oscillation takes place because of the phase relationship between the collector and the base with respect to the emitter of transistor 10, due to inductances 14 and 20, the gain of transistor 10, as modified by the presence of resistor 17 (or its transistor equivalent 17′) and the positive feedback via capacitor 16. The inductances are separate and independent of each other, that is to say, mutual coupling between inductances 20 and 14 is not relied upon for obtaining a state of oscillation. The effect of the input impedance of transistor 10, that is to say, its base-emitter impedance as viewed via R17 (or its transistor equivalent 17′) on inductance 20 is relied upon for reducing the frequency of oscillation, below the resonant frequency of inductances 14 and 20 in series with capacitance 16 taken alone.

Variations in the value of this input base emitter impedance of transistor 10 as viewed from inductance 20 (that is to say between points 31 and 18 (FIG. 3) and the consequential variations in the frequency of oscillation is the means by which frequency modulation is achieved in this invention. Of course it is understood that the frequency of oscillation will also be affected by the change in the Miller effect on this input impedance of transistor 10 consequential upon changes in the gain of transistor 10 brought about by changes in the value of R17. It is the application and use of these changes in the input impedance of transistor 10 brought about by changes in R17 which comprises the basis of this invention.

Taking this variable reactive portion of the invention: Looking between points 31 and 18, FIG. 3, one sees the base-emitter capacitance of transistor 10 as modified by the effect of R17 or its equivalent (transistor 17′) FIG. 3, i.e. the $$\textit{Base emitter capacitance} \times \frac{1}{(1+\text{gm. } R_{17})}$$

Now the base-emitter capacitance in any transistor is proportional to the emitter current, i.e. $C_{b-e}$ is proportional to $$\frac{1}{R}$$

in the emitter circuit. In this case the base-emitter capacitance $$C_{b-e} \alpha \frac{1}{R_{17}} \qquad (a)$$

Figure 3:
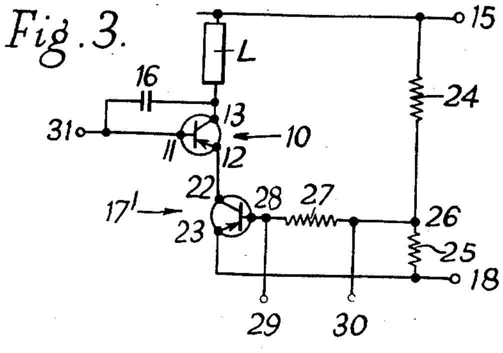

Now viewed between points 31 and 18 FIG. 3 we will have capacity input proportional to the base-emitter capacitance of transistor 10, multiplied by $$\frac{1}{(1+\text{gm. } R_{17})}$$

(the gm. of course, is that of transistor 10 also.)

$$=\textit{Capacitance between } 18 \text{ and } 31 = C_{b-e} \times \frac{1}{(1+\text{gm. } R_{17})}$$

From above (*a*)

$$C_{(31-18)} \alpha \frac{1}{R_{17}} \times \frac{1}{(1+\text{gm. } R_{17})}$$

and for values when gm. $R_{17}$ exceeds 10 is approximately $$\alpha \text{ to } \frac{1}{R_{17}} \times \frac{1}{R_{17}} = \frac{1}{(R_{17})^2} \therefore (R_{17})^2 \alpha \frac{1}{C_{(31-18)}}$$

or $$R_{17} \alpha \frac{1}{\sqrt{C_{(31-18)}}}$$

and consequently R17 changes=frequency changes. This is why the circuit as shown in FIGS. 2 and 3 will give very linear frequency deviation about a means frequency (of the order of some 10% of the center frequency).

It will now be seen that the potential at the base 11 with respect to 18, and the collector 13 with respect to 18, are therefore 180° out of phase, and the potential of the emitter 12 will be in phase with 18. The gain of the transistor will depend on its gm. and also the amount of negative feedback introduced by R17. Therefore provided the gain is sufficient to overcome the losses in the circuit oscillation will commence and be maintained.

The frequency will be determined by inductance 20 (modified by the base emitter capacitance) plus inductance 14 and also the capacitance 16 (modified by the base-collector capacitance). Therefore, as stated in the specification, the maximum possible frequency of oscillation will be slightly less than:

$$\frac{1}{2\pi\sqrt{(L20+L14)C16}}$$

This occurs when R17 is at the maximum value which will still permit oscillation, i.e. when the gain is just sufficient to overcome the losses, i.e. approximately 1.

When the conditions are thus L20 will be modified least by the reflected Miller capacitance, and the base-emitter capacitance. This is because the negative feedback created by the resistance 17 reduces this emitter base capacitance when viewed between the points 11 and 18, i.e. as seen by the inductance 20.

From the foregoing it will be readily understood that by changing R17, a greater or smaller amount of negative feedback results and consequently a greater or smaller amount of capacitance will be seen across inductance 20. This capacitance will also be supplemented by the Miller C which will also be varied in amount by varying resistance 17.

It is well known that Miller capacitance is a function of gm., but change in resistance 17 changes the effective gm. of the transistor and consequently this also determines the capacitance as seen by inductance 20. (In this case natural Miller is supplemented by C16.)

The variable resistor 17 in the lead to the emitter electrode 12 of the transistor can be varied for changing the frequency below the maximum frequency, and in a practical circuit the range of adjustment is from maximum frequency to a frequency approximately one half of the maximum.

Output from the oscillator may be taken from a number of points such as the emitter electrode 12 of the transistor 10 and other suitable points will be apparent to those skilled in the art.

In order to effect frequency-modulation of the generated oscillations by means of varying voltage, such as, for example, a speech voltage, the variable resistor 17 in the lead to the emitter electrode 12 can be replaced by a device such as a transistor 17′ as shown in FIG. 2.

In the example in FIG. 2 the transistor 17′ is of the same type as the transistor 10. The collector electrode 22 of the second transistor 17′ is connected to the emitter electrode 12 of the first transistor 10 and the emitter electrode 23 of the transistor 17′ is connected to the terminal 18 of the source of supply. A further potential divider comprising two resistors 24 and 25 is connected across the source of supply, and an intermediate tapping 26 on the potential divider is connected through a resistor 27 to the base electrode 28 of the further transistor 17′. In this way the base electrode 28 of the further transistor 17′ is biased and hence the resistance of the transistor 17′ measured between the emitter and collector electrodes thereof can be pre-determined. By applying a varying potential across the resistor 27 in series with the base circuit of the further transistor 17′ the bias on the base, and hence the resistance of the transistor 17′ can be varied accordingly, whereby the frequency of the generated oscillations can be modulated. This varying potential can be applied from two terminals 29 and 30. Other ways of varying the potential on the base electrode of the further transistor 17′ will be apparent to those skilled in the art. For example, the series resistor 27 may be replaced by a secondary winding of an audio-frequency transformer (not shown), speech voltages being applied to the primary winding of this transformer, or the secondary winding of such a transformer can be connected across the resistor 27.

It will be understood that devices other than transistors may be used for the purpose of achieving varying resistance values, for example a rectifier or a translating device other than a transistor such as a thermionic valve will produce satisfactory results.

It will be apparent to those skilled in the art that the variable reactive element FIG. 3, of the oscillatory circuit when arranged as a frequency modulator FIG. 2, will be extractable as such, and the device FIG. 3, between the points 31 and 18 will appear as a variable reactance to other oscillatory circuits.

This device, FIG. 3, would provide a suitable device by which frequency modulation could be achieved in many such circuits.

The load L of transistor 10, FIG. 3, could be resistive or reactive. The capacitor 16 could be reduced to the collector-base capacitance of the transistor.

What we claim is:

1. A transistor oscillator comprising a transistor having a base electrode, a collector electrode and an emitter electrode, the collector electrode being connected through an inductor to one terminal of a source of operating voltage and through a capacitor to the base electrode, the base electrode being connected through a further inductor to another terminal of the said source which is of the opposite polarity to the first said terminal, and the emitter electrode being connected through a resistive device to the said other terminal of the source, the arrangement being such that, in operation, feedback from the collector electrode principally by way of the capacitor to the base electrode is such as to sustain oscillations in the circuit.

2. A transistor oscillator according to claim 1, and wherein the said resistive device is a variable resistor.

3. A transistor oscillator according to claim 1, and wherein the resistive device is a further transistor.

4. A transistor oscillator according to claim 3, and wherein the further transistor is of the same type as the first said transistor, the collector electrode of the further transistor being connected to the emitter electrode of the first said transistor, the emitter electrode of the further transistor being connected to the said further terminal of the source of operating potential, and circuit means being provided for applying a modulating voltage to the base electrode of the further transistor.

5. A transistor oscillator according to claim 4, and wherein the said circuit means comprise a potential divider across the source of operating potential, and a connection between a tap on the potential divider to the base electrode of the further transistor, the last said connection including means whereby the bias potential provided, in operation, by the potential divider for the base electrode of the further transistor can be modulated.

References Cited in the file of this patent

UNITED STATES PATENTS

| | | |
|---|---|---|
| 2,663,800 | Herzog | Dec. 22, 1953 |
| 2,851,540 | Theriault | Sept. 9, 1958 |
| 2,855,568 | Lin | Oct. 7, 1958 |
| 2,879,480 | Reed | Mar. 24, 1959 |